United States Patent [19]
Thomas

[11] Patent Number: 5,351,981
[45] Date of Patent: Oct. 4, 1994

[54] BICYCLE KICKSTAND ACCESSORY

[75] Inventor: Jan B. Thomas, Hilton Head, S.C.

[73] Assignee: Janko U.S.A., Hilton Head, S.C.

[21] Appl. No.: 9,835

[22] Filed: Jan. 27, 1993

Related U.S. Application Data

[63] Continuation-in-part of Ser. No. 923,062, Jul. 31, 1992, abandoned.

[51] Int. Cl.⁵ .............................................. B62H 1/00
[52] U.S. Cl. .................... 280/301; 280/293; 248/188.9
[58] Field of Search ............. 280/293, 298, 301, 304; 248/188.9, 346

[56] References Cited

U.S. PATENT DOCUMENTS

| | | | |
|---|---|---|---|
| 1,563,700 | 12/1925 | Frankenstein | 248/188.9 |
| 2,596,009 | 5/1952 | Connor et al. | 248/346 |
| 3,955,829 | 5/1976 | Bussler | 280/293 |
| 3,998,470 | 12/1976 | Houston | 280/301 |
| 4,457,530 | 7/1984 | Johnson | 280/293 |
| 4,521,031 | 6/1985 | Huth | 280/293 |
| 4,625,987 | 12/1986 | Marsh | 280/293 |
| 4,768,800 | 9/1988 | Johns | 280/293 |
| 4,770,326 | 9/1988 | Thompson | 224/39 |
| 4,846,491 | 7/1989 | Caceres | 280/293 |
| 4,869,453 | 9/1989 | Newman | 280/301 |
| 4,971,347 | 11/1990 | Cline | 280/301 |
| 4,986,557 | 1/1991 | Muszynski | 280/298 |

FOREIGN PATENT DOCUMENTS

| | | | |
|---|---|---|---|
| 14727 | 11/1911 | France | 248/346 |
| 1256889 | 2/1961 | France | 248/188.9 |
| 302814 | 2/1937 | Italy | 280/293 |
| 876471 | 9/1961 | United Kingdom | 248/188.9 |

Primary Examiner—Margaret A. Focarino
Assistant Examiner—Peter English
Attorney, Agent, or Firm—McAndrews, Held & Malloy, Ltd.

[57] ABSTRACT

The present invention is directed to a kickstand attachment which provides a substantially increased weight bearing surface area. The present invention permits the bicycle to remain in an upright position on soft surfaces or on a particulate surface without the kickstand penetrating the surface.

16 Claims, 2 Drawing Sheets

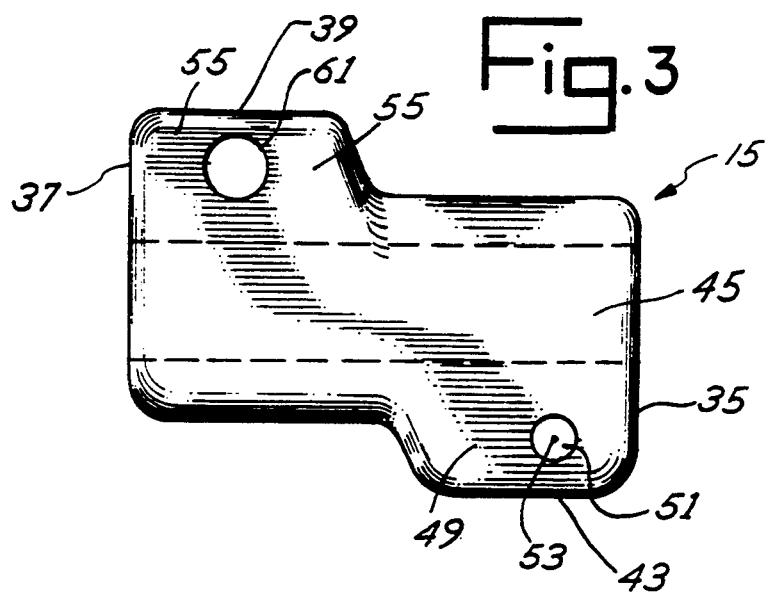
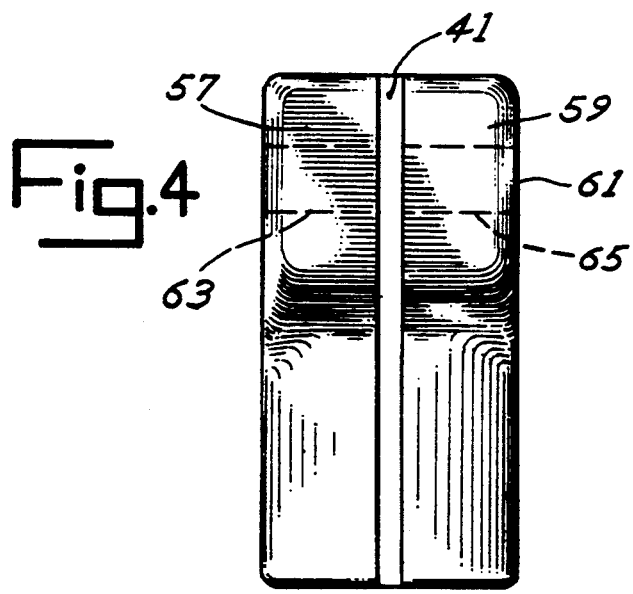
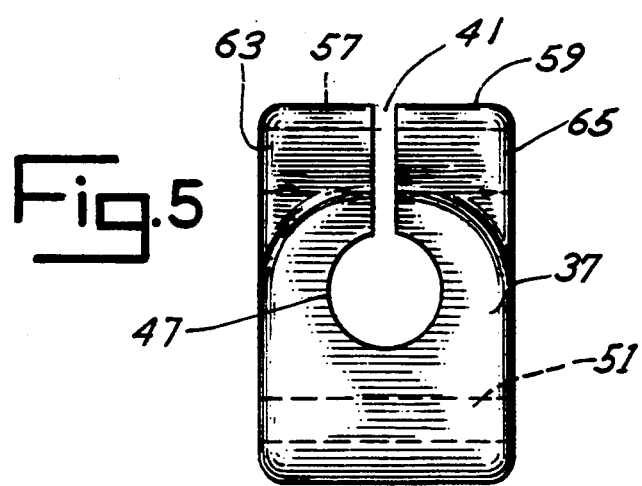

BICYCLE KICKSTAND ACCESSORY

RELATED APPLICATION

This Application is a continuation-in-part application of prior U.S. patent application Ser. No. 07/923,062, filed Jul. 31, 1992 now abandoned. Prior application Ser. No. 07/923,062 is incorporated herein by reference.

BACKGROUND OF THE INVENTION

The present invention relates to a bicycle kickstand and more particularly to an accessory for attachment to the terminal or distal end of a conventional bicycle kickstand. The accessory serves to substantially increase the surface area of the weight bearing end of the kickstand so as to prevent the weight bearing end from penetrating soft-surfaces such as sand, soil, turf, hot asphalt, gravel or other surfaces.

A bicycle kickstand is used to support a bicycle in an upright position when the bicycle is not in use. Supporting a bicycle in an upright position helps minimize damage to the surface and finish of the bicycle and makes it more convenient to mount. However, the use of a bicycle kickstand is limited by the relatively small surface area of the terminal end of the kickstand. Because the terminal end of a conventional kickstand typically has such a small surface area, the weight of the bicycle may force the weight bearing end to penetrate particulate support surfaces such as gravel or sand or soft surfaces such as soil, turf or hot asphalt which results in the bicycle falling.

Therefore, it is an object of the present invention to provide an accessory for attachment to a conventional bicycle kickstand which increases substantially the surface area of the terminal end of a kickstand thus minimizing the tendency of the kickstand to penetrate particulate surfaces or soft surfaces.

A conventional kickstand typically comprises an elongated arm or rod which extends downward from a bicycle frame to its terminal or weight-bearing end. The rod typically has an outward bend spaced close to its terminal end. A terminal end surface is formed by a planar cutting of the rod which may be solid or hollow. The terminal end surface meets the ground to support the associated bicycle. The kickstand is generally moveable from its extended position to a storage position when the kickstand is not in use. The kickstand rod end opposite the terminal end is typically mounted in a bracket which is attached to the bicycle frame and is provided with a spring mechanism so as to provide resistance to movement of the rod. The bracket itself typically has two recesses, one to aid in maintaining the rod in the extended position and one to aid in maintaining the rod in the storage position.

It is an object of the invention to provide an inexpensive kickstand accessory having a simple design and which is easily mounted or removed from a conventional kickstand and which substantially increases the surface area of the weight bearing end of a bicycle kickstand.

SUMMARY OF THE INVENTION

It is an object of the present invention to provide a bicycle kickstand accessory for attachment to the weight bearing end of a bicycle kickstand. The accessory comprises a base member having a bottom surface of an area substantially larger than the weight-bearing end of the kickstand. The base member is manually lockable to the rod.

BRIEF DESCRIPTION OF THE DRAWINGS

FIG. 3 is a side view of the split clamp of the kickstand accessory of FIG. 1.

FIG. 4 is a top view of the split clamp of FIG. 3.

FIG. 5 is a front end view of the split clamp of FIG. 3.

DETAILED DESCRIPTION OF THE INVENTION

Figure 1:
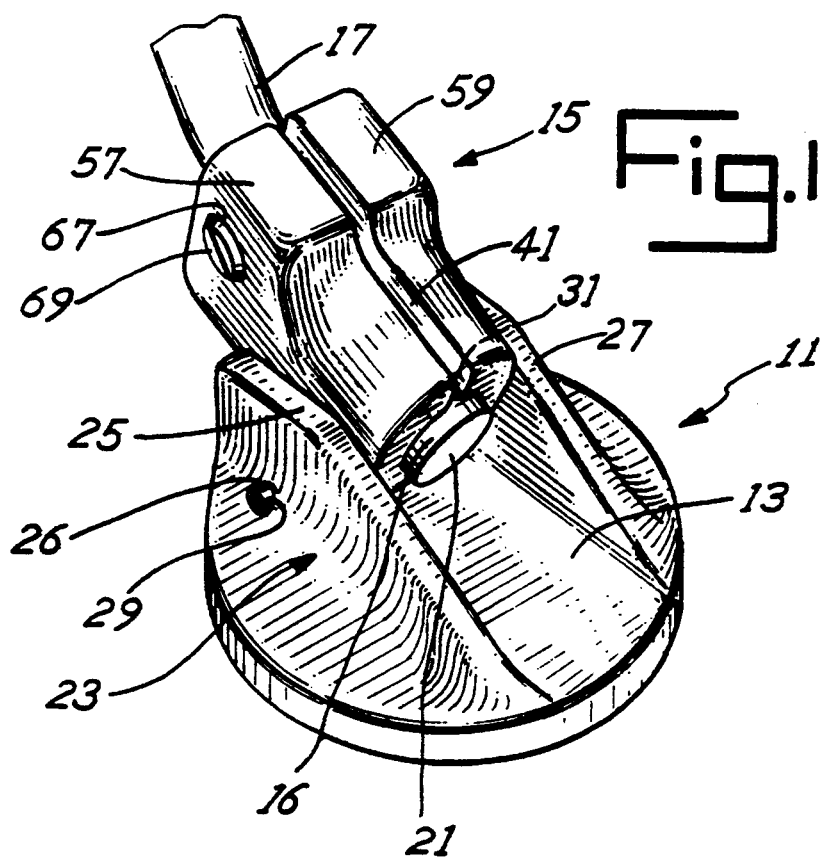
FIG. 1 a perspective view of a preferred embodiment of a kickstand accessory secured to the terminal end of a conventional bicycle kickstand.

Referring to FIG. 1, a kickstand accessory 11 comprises a base support member 13 pivotally mounted to a split clamp member 15. Clamp member 15 provides for the attachment of the accessory 11 to the terminal end 16 of a conventional bicycle kickstand 17.

Figure 2:
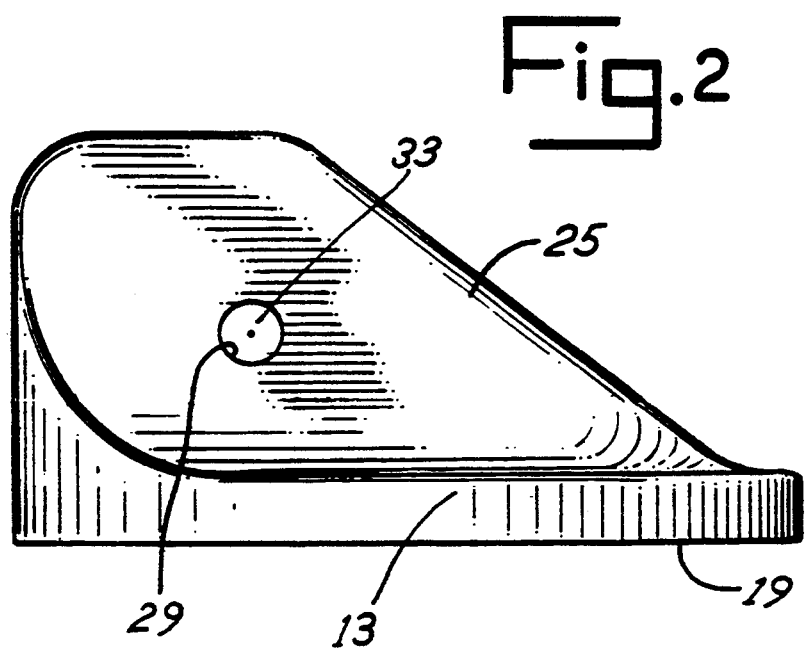
FIG. 2 is a side view of the base plate of the kickstand accessory of FIG. 1.

As shown in FIGS. 1 and 2, the base support member 13 includes a bottom surface 19 which is circular in shape and serves to provide a flat support for contact with the ground. As will suggest itself, shapes other than circular may be used for bottom surface 19.

Preferably, base support member 13 is molded from a suitably rigid plastic such as polypropylene or other plastic material. Split clamp member 15 is also preferably molded from polypropylene or other suitably dense and rigid plastic. Base member 13, as well as clamp member 15, may be fabricated from metal and/or other materials.

Bottom surface 19 has an area of substantially larger size than the terminal end surface 21 of kickstand 17. "Substantially larger size", as used herein, means a size greater than twice that of a conventional kickstand. A conventional kickstand has a bottom surface 21 of ½ inch in diameter, providing a surface area of almost 0.20 square inches. Typically, bottom surface 19 will be at least 1½ inches in diameter, providing a bottom surface area of approximately 1.77 square inches.

Bottom surface 19 of base support member 13 may be adapted so as to increase the frictional coefficient of the base support member relative to ground. Such adaptations may include (i) concentric or radial ribs integrally molded into bottom surface 19, or a combination of both, (ii) high friction durable rubber secured to member 13 for providing a rubber surface 19, or (iii) irregular textures or other adaptations molded onto bottom surface 19, which serve to increase the frictional contact with a ground or a support surface. In addition, bottom surface 19 may be molded to include a trademark or fanciful design.

Referring to FIG. 1, base support member 13 includes a mounting bracket 23 formed of two generally parallel upstanding mounting tabs 25,27. Tabs 25, 27 carry respective apertures 29, 31 defining a pivot axis 33 (FIG. 2). Split clamp member 15 is pivotally mounted to tabs 25, 27 via a pivot pin 26. Mounting tabs 25, 27 are spaced apart a sufficient distance to receive clamp member 15 in relative close spacing and allow clamp member 15 to pivot freely on tabs 25, 27 relative to base support member 13.

Referring to FIGS. 3–5, split clamp member 15 has a distal end 35, a proximal end 37, a top surface 39, and a bottom surface 43. A split 41 is formed in top surface 39 and a cylindrical hole 45 passes through the longitudinal axis of member 15. Hole 45 is defined by a partial cylindrical inner surface 47 and is slightly larger than the cylindrical size of the terminal end of kickstand 17 so that kickstand 17 is slideable into hole 45.

Distal end 35 of the clamp member 15 has increased depth over that of proximal end 37 relative to hole 45 so as to provide a mounting tab 49 located below hole 45. Mounting tab 49 is of sufficient area to define a through hole 51 which passes through member 15. Through hole 51 provides a pivot axis 53 for pivotal mounting of member 15 to base support member 13 via pivot pin 26.

The proximal end 37 of the split member 15 has increased height over that of the distal end 35 relative to hole 45 so as to provide a mounting tab 55 located above hole 45. Tab 55 together with split 41 define a pair of locking tabs 57,59 (FIG. 4) for firmly securing split clamp member 15 to the kickstand 17. Locking tabs 57, 59 extend upwardly above hole 45 so as to provide a sufficient area to define a through hole 61 defined by a pair of cylindrical surfaces 63,65 for receiving a locking screw 67 (FIG. 1). Locking screw 67 is manually turned for causing movement of locking tabs 57, 59 together. Such movement causes constriction of hole 45 to frictionally grip the rod of the kickstand for holding assembly 11 securely thereto.

Screw 67 may include a turnable head 69 on one end and a threaded bolt (not shown) on the other end. The turnable head 69 may include a screw driver receiving slot or hexagonal shape hole for permitting manual manipulation of the screw to constrict hole 45.

Assembly 11 is attached to the kickstand by loosening or removing the locking screw 67. The split clamp member is slid onto the terminal end of the kickstand so as to allow only a small portion of the kickstand to protrude beyond the distal end of the split clamp member 15 as shown in FIG. 1. The locking screw 67 is then firmly tightened so as to provide sufficient frictional contact between the surface 47 of the split clamp member 15 with the terminal end of the kickstand to prevent removal of the split clamp member.

An advantage of the assembly 11 embodiment is that the pivotable attachment of the base support member 13 to clamp member 15 allows the base support member to be pivoted back toward the frame of the bicycle when the kickstand is not in use thus keeping the accessory out of the way. In addition, base member 13 may pivot relative to the ground for an uneven surface.

I claim:

1. A bicycle kickstand accessory for attachment to the terminal end of a conventional bicycle kickstand of an associated bicycle comprising:

a base support member having a bottom surface of an area substantially larger than the area of the terminal end surface of the kickstand, said base support member including pivot means for defining a pivot axis disposed above said bottom surface and spaced laterally from the center of said bottom surface; and a clamp member pivotally mounted to said base support member for releaseably securing said base support member to the terminal end of the kickstand, said clamp member including:

A. a unitary body member comprising:
(1) a constrictable opening for receiving the terminal end of the kickstand;
(2) a first mounting tab pivotally attached to said pivot means for pivotally mounting said base support member to said unitary body member, said first mounting tab extending outwardly from said opening; and
(3) a second mounting tab extending outwardly from said opening, said second mounting tab being formed of a pair of locking tabs; and B. applied force means for forcing said pair of locking tabs relative to one another to constrict said opening, such that said bottom surface engages the ground for providing support to the kickstand for resting the associated bicycle in an upright position.

2. A bicycle kickstand accessory according to claim 1 wherein said bottom surface has an area greater than 1.76 square inches.

3. A bicycle kickstand accessory according to claim 1 wherein said opening forms a gripping surface for receiving in forced frictional contact an area of the outer surface of the terminal end of the kickstand; and wherein said applied force means is manually actuable for forcing said gripping surface in frictional contact with said area of the outer surface of the kickstand.

4. A bicycle kickstand accessory according to claim 3 wherein said opening is defined by at least a partial cylindrical surface of a size for receiving the kickstand; and wherein said gripping surface includes at least a portion of said partial cylindrical surface.

5. A bicycle kickstand accessory according to claim 4 wherein said unitary body member includes a split for defining said partial cylindrical surface.

6. A bicycle kickstand accessory according to claim 5 wherein said applied force means constricts said partial cylindrical surface.

7. A bicycle kickstand accessory according to claim 5 wherein said split includes an open slot disposed between said partial cylindrical surface and the outer surface of said clamp member; and wherein said locking tabs are located one on each side of said split.

8. A bicycle kickstand accessory according to claim 7 wherein said applied force means is a screw coupling said locking tabs for causing relative movement thereof by manually turning said screw.

9. A bicycle kickstand accessory according to claim 1 wherein said bottom surface of said base support member is circular.

10. A bicycle kickstand accessory according to claim 1 wherein said bottom surface of said base support member has concentric ridges.

11. A bicycle kickstand accessory according to claim 1 wherein said bottom surface of said base support member has radial ribs.

12. A bicycle kickstand accessory according to claim 1 wherein said bottom surface of said base support member has a rough textured surface.

13. A bicycle kickstand accessory according to claim 1 wherein said first mounting tab has a hole for pivotally mounting said base support member to said unitary body member.

14. A bicycle kickstand accessory according to claim 13 wherein said pivot means includes a pivot pin passing through said hole in said first mounting tab.

15. A bicycle kickstand accessory according to claim 14 wherein said pivot means includes a pair of mounting tabs for supporting said pivot pin.

16. A bicycle kickstand accessory according to claim 14 wherein said clamp member defines the disposition of the terminal end of the kickstand relative to the ground; and wherein said hole in said first mounting tab is located beneath the terminal end of the kickstand when said bottom surface engages the ground.

* * * * *